(12) United States Patent
Richard

(10) Patent No.: US 12,383,380 B2
(45) Date of Patent: Aug. 12, 2025

(54) DENTAL IMPLANT WITH IMPROVED THREADING

(71) Applicant: ANTHOGYR, Sallanches (FR)

(72) Inventor: Hervé Richard, Notre Dame de Bellecombe (FR)

(73) Assignee: ANTHOGYR, Sallanches (FR)

( * ) Notice: Subject to any disclaimer, the term of this patent is extended or adjusted under 35 U.S.C. 154(b) by 431 days.

(21) Appl. No.: 17/611,940

(22) PCT Filed: Jul. 4, 2020

(86) PCT No.: PCT/IB2020/056311
§ 371 (c)(1),
(2) Date: Nov. 17, 2021

(87) PCT Pub. No.: WO2021/005482
PCT Pub. Date: Jan. 14, 2021

(65) Prior Publication Data
US 2022/0226078 A1 Jul. 21, 2022

(30) Foreign Application Priority Data
Jul. 8, 2019 (EP) .................................... 19185036

(51) Int. Cl.
*A61C 8/00* (2006.01)
(52) U.S. Cl.
CPC .......... *A61C 8/0022* (2013.01); *A61C 8/0037* (2013.01)
(58) Field of Classification Search
CPC ....... A61C 8/00; A61C 8/0022; A61C 8/0037; A61C 8/0025
See application file for complete search history.

(56) References Cited

U.S. PATENT DOCUMENTS

| 2007/0099153 | A1 | 5/2007 | Fromovich | |
|---|---|---|---|---|
| 2008/0261175 | A1* | 10/2008 | Hurson | A61C 8/0025 433/173 |

(Continued)

FOREIGN PATENT DOCUMENTS

| EP | 0895757 A1 * | 2/1999 | |
|---|---|---|---|
| EP | 3453358 A1 * | 3/2019 | ........... A61C 8/0022 |

(Continued)

OTHER PUBLICATIONS

WO 2015118543 machine translation (Year: 2015).*
EP 0895757 machine translation (Year: 1999).*

*Primary Examiner* — Nicholas D Lucchesi
(74) *Attorney, Agent, or Firm* — William H. Eilberg

(57) ABSTRACT

A dental implant includes an implant body extending along a longitudinal axis between a coronal end and an apical end, the implant body having a core along which a helical threading having at least one thread extends. The dental implant includes at least one section in which the threading has a height which gradually decreases in the direction of the coronal end and in which the core is tapered in the direction of the apical end, the thread including an apical surface facing the apical end of the dental implant, a coronal surface facing the coronal end of the dental implant, and a peripheral lateral surface connecting the apical surface and the coronal surface of the thread. The apical surface of the thread has, in a cross-sectional view along the longitudinal axis, a first profile repeating according to an apical pitch. The coronal surface of the thread has, in a cross-sectional view along the longitudinal axis, a second profile repeating according to a coronal pitch. In one section, the apical pitch is greater than the coronal pitch.

8 Claims, 5 Drawing Sheets

(56) References Cited

U.S. PATENT DOCUMENTS

| | | |
|---|---|---|
| 2009/0325126 A1 | 12/2009 | Fromovich |
| 2010/0112523 A1 | 5/2010 | Fromovich |
| 2011/0244427 A1* | 10/2011 | Hung ................... A61C 8/0039 |
| | | 433/174 |
| 2012/0178048 A1* | 7/2012 | Cottrell ................ A61C 8/0025 |
| | | 433/174 |
| 2012/0295225 A1 | 11/2012 | Fromovich |
| 2013/0065198 A1 | 3/2013 | Abboud |
| 2013/0089834 A1 | 4/2013 | Fromovich |
| 2016/0081771 A1 | 3/2016 | Fromovich |
| 2019/0008614 A1* | 1/2019 | Weitzel ................ A61C 8/0037 |

FOREIGN PATENT DOCUMENTS

| | | | | |
|---|---|---|---|---|
| WO | WO-2008096294 A1 * | 8/2008 | ........... | A61C 8/0022 |
| WO | WO-2015118543 A1 * | 8/2015 | ............... | A61C 8/00 |

\* cited by examiner

DENTAL IMPLANT WITH IMPROVED THREADING

TECHNICAL FIELD OF THE INVENTION

The present invention concerns the field of dental implants and more particularly concerns a dental implant intended to be inserted into the maxillary or mandibular bone of a patient to receive and to carry a dental prosthesis.

When inserting an implant into the maxillary or mandibular bone of a patient it Is Important to obtain the best possible post-implantation stability (also known as primary stability) in order to be able to load said implant as quickly as possible, or even immediately, that is to say before bone has colonized the lateral surface of the implant.

The primary stability of an implant depends in particular on the density of the bone in which it is implanted.

When the bone is of low density (classically of density D3 or D4 according to the Misch classification) a cylindrical hole is produced in the maxillary or mandibular bone with the aid of a drill, into which hole the endo-bone part of a dental implant is then inserted that has a volume greater than the volume of the hole formed in the bone. There may for example be used a known dental implant comprising an implant body extending along a longitudinal axis between a coronal end and an apical end, said implant body having a core, along which there extends a helical threading having at least one thread, said dental implant having at least one segment in which the threading has a height which decreases progressively in the direction of the coronal end and in which the core is tapered in the direction of the apical end, said at least one thread having an apical surface oriented towards the apical end of the dental implant, a coronal surface oriented towards the coronal end of the dental implant, and a peripheral lateral surface connecting the apical surface and the coronal surface of said at least one thread. A dental implant of this kind is for example described in the document EP 1 624 826. The dental implant generally has an apical end the cross section of which is substantially equal to the cross section of the cylindrical hole. During its insertion the dental implant progressively compresses the bone at the periphery of the hole formed in the bone so that the primary stability is increased.

However when a dental implant of this kind is inserted into bone of greater density (classically of density D1 or D2 according to the Misch classification) the density of the bone renders the latter less easily compressible with the result that the penetration of the dental implant necessitates a much higher screwing torque and sometimes even a torque too high to be withstood without damage by the dental implant (in particular at the level of its connector arrangement enabling it to be screwed in by driving it in rotation).

The document EP 1 624 826 describes a dental implant conforming to the preamble of claim 1. Said at least one thread of that dental implant therefore includes an apical surface oriented towards the apical end of the dental implant, a coronal surface oriented towards the coronal end of the dental implant and a peripheral lateral surface connecting the apical surface and the coronal surface of said at least one thread. The apical surface of said at least one thread implicitly has in section along the longitudinal axis of the dental implant a first profile which repeats according to an apical pitch while the coronal surface of said at least one thread implicitly has in section along the longitudinal axis of the dental implant a second profile which repeats according to a coronal pitch. In the above document there is however no explicit mention of an apical pitch and of a coronal pitch of a thread in the sense of the present invention. Nor is there any mention of any difference that may exist between the apical pitch and the coronal pitch or of any feature that would have the result of inducing a difference between the apical pitch and the coronal pitch. To the contrary, the apical pitch and the coronal pitch of the threads of the above implant seem to be equal. Nor it is ever explained how the above dental implant is manufactured. The same applies to the documents US 2008/261175, WO 2017/129826 and EP 2 570 096.

SUMMARY OF THE INVENTION

One problem proposed by the present invention is to provide a dental implant that can be inserted into low density bone and to compress the bone for good primary stability, but also that is able to be inserted in bone of greater density without the screwing insertion torque becoming too high because of this.

To achieve the above and other objects, the invention proposes an implant body extending along a longitudinal axis between a coronal end and an apical end, said implant body having a core, along which there extends a helical threading having at least one thread, said dental implant having at least one segment in which the threading has a height which decreases progressively in the direction of the coronal end and in which the core is tapered in the direction of the apical end, said at least one thread having an apical surface oriented towards the apical end of the dental implant, a coronal surface oriented towards the coronal end of the dental implant, and a peripheral lateral surface connecting the apical surface and the coronal surface of said at least one thread, in which:
- the apical surface of said at least one thread has, in section along the longitudinal axis (I-I), a first profile which repeats according to an apical pitch,
- the coronal surface of said at least one thread has, in section along the longitudinal axis, a second profile which repeats according to a coronal pitch, characterized in that, in said at least one segment, the apical pitch is greater than the coronal pitch.

In the prior art implant described in the documents EP 1 624 826, US 2008/261175, WO 2017/129826 and EP 2 570 096 the coronal and apical pitches are equal. In the segment in which the threading has a height that decreases progressively in the direction of the coronal end and in which the core tapers in the direction of the apical end the width of the peripheral lateral surface (along the longitudinal axis) of the thread increases in the direction of the coronal end. A result of this is that in this segment the threading radially compresses the bone more in the vicinity of the coronal end than in the vicinity of the apical end, which markedly increases the screwing torque as and when said segment of the dental implant is inserted in the bone.

In the dental implant according to the present invention, providing in the segment in which the threading has a height that decreases progressively in the direction of the coronal end and in which the core tapers in the direction of the apical end a threading with an apical pitch that is greater than the coronal pitch procures less increase of the width of the peripheral lateral surface (along the longitudinal axis) in the direction of the coronal end. This therefore reduces the screwing insertion torque.

To facilitate the manufacture of the implant, in a first embodiment the coronal and apical pitches may advantageously be constant.

Apical and coronal pitches may preferably be chosen so that the ratio of the larger to the smaller of the apical and coronal pitches belongs to the interval] 1; 1.1]. Thus good results are obtained in terms of reduction of the screwing insertion torque.

In a second embodiment one of the coronal pitch and apical pitch is constant while the other of the coronal pitch and apical pitch increases progressively. The coronal pitch or the apical pitch can therefore be varied so as to obtain in the segment in which the threading has a height that decreases progressively in the direction of the coronal end and in which the core tapers in the direction of the apical end a substantially constant width of the peripheral lateral surface (along the longitudinal axis).

To compress the bone progressively, the core may advantageously be tapered conically in the direction of the apical end on said at least one segment of the length of the implant.

In said at least one segment of the length of the implant in which the core is tapered in the direction of the apical end the threading may advantageously be tapered in the direction of the apical end, being preferably conical.

In said at least one segment of the length of the implant:
the core and the threading are preferably conical,
the core advantageously has a taper greater than the taper of the threading.

In accordance with another aspect, the present invention proposes a method for manufacturing a dental implant comprising an implant body extending along a longitudinal axis between a coronal end and an apical end, said implant body having a core, along which there extends a helical threading having at least one thread, characterized in that:
a) during a first threading cycle, at least one thread is formed by a threading tool in longitudinal relative movement according to a first pitch, such that:
in at least one segment of the dental implant, said at least one thread has a height which decreases progressively in the direction of the coronal end, and the core is tapered in the direction of the apical end,
said at least one thread has a coronal surface oriented substantially in the direction of the coronal end,
said at least one thread has an apical surface oriented substantially in the direction of the apical end,
said at least one thread has a peripheral lateral surface connecting the apical surface and the coronal surface,
b) during a second threading cycle, in said at least one length segment of the dental implant, a threading tool in longitudinal relative movement according to a second pitch is used to recut:
the apical surface, the second pitch being greater than the first pitch, and/or
the coronal surface, the second pitch being smaller than the first pitch.

A method of this kind enables a dental implant to be obtained for which the screwing insertion torque is reduced relative to a dental implant in which the first and second pitches are equal in said segment in which the threading has a height that decreases progressively in the direction of the coronal end and in which the core is tapered in the direction of the apical end.

To facilitate manufacture the first and second pitches may advantageously be constant.

The ratio of the larger to the smaller of the first and second pitches preferably belongs to the interval]1; 1.1].

The first and second pitches may advantageously be between 0.6 mm and 3 mm.

BRIEF DESCRIPTION OF THE DRAWINGS

Other objects, features and advantages of the present invention will emerge from the following description of particular embodiments given with reference to the appended figures, in which.

DESCRIPTION OF THE PREFERRED EMBODIMENTS

Figure 3:
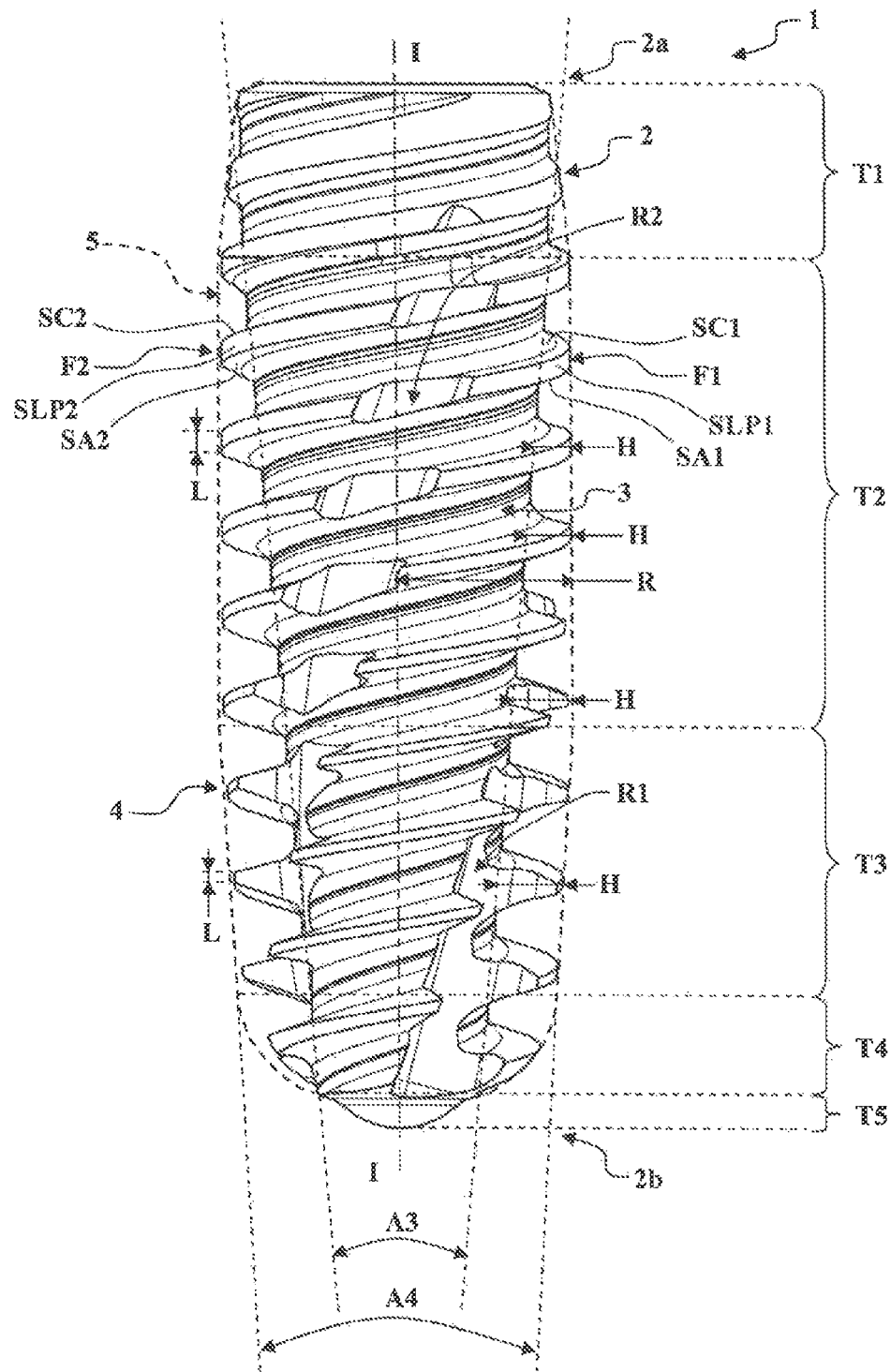
FIG. 3 is a side view of the particular embodiment of dental implant according to the invention on completion of manufacture.
Figure 4:
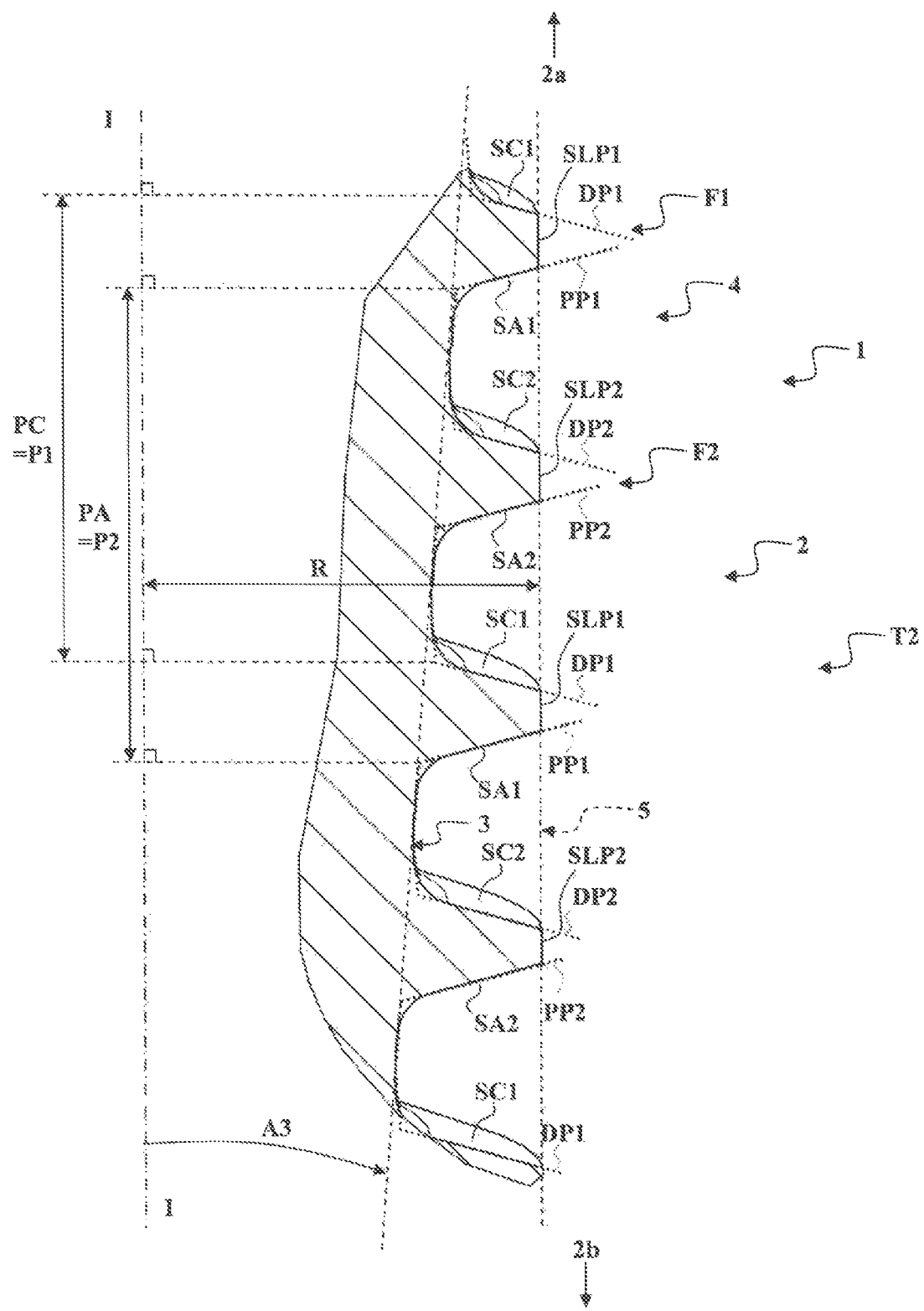
FIG. 4 is a partial view in longitudinal section of the dental implant from FIG. 3.

In FIGS. 3 and 4 is shown one particular embodiment of dental implant 1 according to the invention.

The dental implant 1 comprises an implant body 2 extending along a longitudinal axis I-I between a coronal end 2a and an apical end 2b, said implant body 2 having a core 3 along which there extends a helical threading 4 having at least one thread. Here the threading 4 comprises two threads F1 and F2.

The threads F1 and F2 respectively include an apical surface SA1 and SA2 oriented towards the apical end 2b of the dental implant 1, a coronal surface SC1 and SC2 oriented towards the coronal end 2a of the dental implant 1. A peripheral lateral surface SLP1 connects the apical surface SA1 and the coronal surface SC1. A peripheral lateral surface SLP2 connects the apical surface SA2 and the coronal surface SC2.

The exterior shape of the implant body 2 and the exterior shape of its core 3 are more particularly underlined in FIGS. 1 to 4 by means of the external envelope 5 of the implant body 2 and dashed lines. It is therefore seen that the implant body 2 comprises five successive segments T1 to T5 from its coronal end 2a to its apical end 2b.

In the segment T1 the core 3 is substantially cylindrical while the threading 4 is conical with a taper oriented towards the coronal end 2a. The height H (in a plane substantially perpendicular to the longitudinal axis I-I) of the threads F1 and F2 therefore decreases in the direction of the coronal end 2a. This progressive decrease in the cross section of the dental implant 1 in the direction of its coronal end 2a enables account to be taken of the volume of bone that is thinned in the vicinity of the bony crest of the maxillary or mandibular bone in the vestibulo-palatine direction. This enables esthetic integration of the dental implant 1.

In the segment T2 the core 3 tapers in the direction of the apical end 2b, being tapered with a taper angle A3 oriented towards the apical end 2b while the threading 4 is substantially cylindrical with a constant radius R. The height H (in a plane substantially perpendicular to the longitudinal axis I-I) of the threads F1 and F2 therefore increases progressively in the direction of the apical end 2b while the width L (along the longitudinal axis) of the peripheral lateral surfaces SLP1 and SLP2 of the threads F1 and F2 increases progressively in the direction of the coronal end 2a.

In the segment T3 the core 3 is also conical. Its taper is the same as that in the segment T2. The threading 4 also tapers in the direction of the apical end 2b, being conical with a taper oriented towards the apical end 2b. The variation of the height H of the threading 4 depends on the relation between the respective cone angles A3 and A4 of the core 3 and of the threading 4:
  if the cone angle A3 of the core 3 is greater than the cone angle A4 of the threading 4 the height H of the threading 4 increases in the direction of the apical end 2b,
  if the cone angle A3 of the core 3 is equal to the cone angle A4 of the threading 4 the height H of the threading 4 is substantially constant in the direction of the apical end 2b,
  if the cone angle A3 of the core 3 is less than the cone angle A4 of the threading 4 the height H of the threading 4 decreases in the direction of the apical end 2b.

In the particular embodiment shown in the figures the cone angle A3 is greater than the cone angle A4 and so the height H of the threading 4 increases in the direction of the apical end 2b.

In the segment T4 the core 3 is also conical. Its taper is the same as that in the segments T2 and T3. The threading 4 is for its part rounded.

The segment T5 is convex, of half-lens shape. It is entirely optional.

The core 3 therefore tapers in the direction of the apical end 2b over at least one segment of the length of the dental implant 1, here over the segments T2 to T4.

In the segment T2 the threading 4 has a height H (along a radial axis perpendicular to the longitudinal axis I-I) that decreases progressively in the direction of the coronal end 2a. There the core tapers in the direction of the apical end 2b and is more particularly conical with the cone angle A3. All of this is more particularly visible in FIG. 4, which is a detail view in longitudinal section of the segment T2 of the dental implant 1 from FIG. 3.

In this FIG. 4 it is seen that:
  the apical surfaces SA1 and SA2 of the threads F1 and F2 have in section along the longitudinal axis I-I a first profile PP1 and PP2 repeating in accordance with an apical pitch PA,
  the coronal surfaces SC1 and SC2 of the threads F1 and F2 have in section along the longitudinal axis I-I a second profile DP1 and DP2 repeating in accordance with a coronal pitch PC,
  the apical pitch PA is greater than the coronal pitch PC.

Here the coronal pitch PC and the apical pitch PA are constant. The ratio of the apical pitch PA to the coronal pitch PC belongs to the interval]1; 1.1]. In the example shown in FIG. 4 the apical pitch is 2.03 mm while the coronal pitch is 2 mm. The ratio of the apical pitch PA to the coronal pitch PC is therefore more specifically 1.015.

Alternatively, one of the coronal pitch PC or the apical pitch PA may be constant while the other of the coronal pitch PC or the apical pitch PA increases progressively.

It is seen in FIG. 3 that in the segment T3 the core 3 is tapered (and more particularly conical at the angle A3) in the direction of the apical end 2b and the threading 4 also tapers in the direction of the apical end 2b, being conical at an angle A4. In order to have in the segment T3 a height H of threading 4 (along a radial axis perpendicular to the longitudinal axis I-I) that decreases progressively in the direction of the coronal end 2a the core 3 has a taper greater than the taper of the threading 4, which is to say that in practise the angle A3 is greater than the angle A4. In the segment T3 the threads F1 and F2 have the same coronal pitch PC and apical pitch PA features, which is to say that the apical pitch is greater than the coronal pitch PC.

Figure 1:
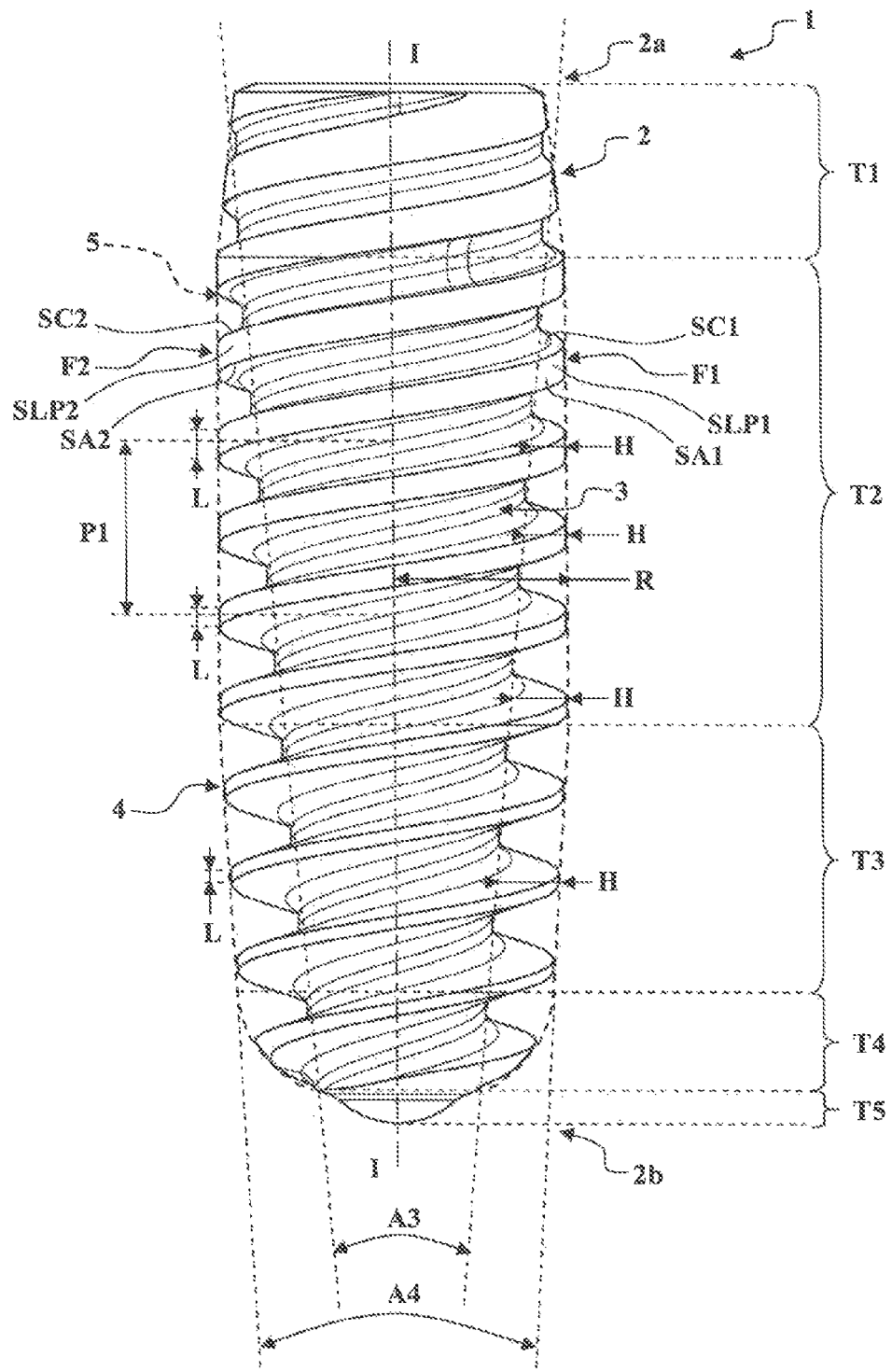
FIG. 1 is a side view of one particular embodiment of dental implant according to the invention after a first manufacturing step.
Figure 2:
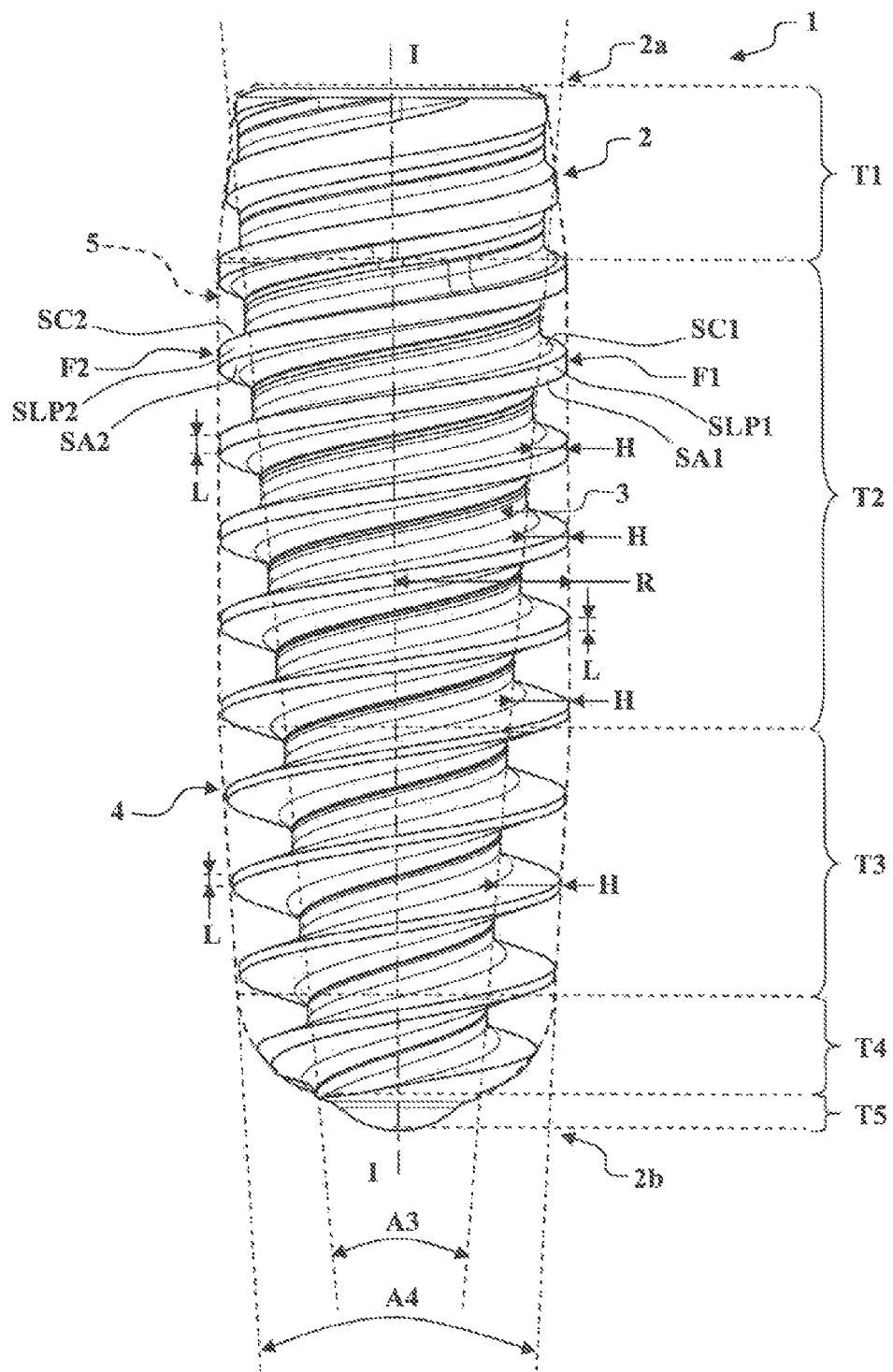
FIG. 2 is a side view of one particular embodiment of dental implant according to the invention after a second manufacturing step.

The manufacture of the dental implant is more particularly explained with the aid of FIGS. 1 and 2.

In FIG. 1 there is seen the implant body 2 worked in accordance with a first threading cycle. During this first threading cycle the threads F1 and F2 are formed by a threading tool in longitudinal relative movement at a first pitch P1 so that:
  in the segments T2 and T3 of length of the dental implant 1 the threads F1 and F2 have a height H (along a radial axis perpendicular to the longitudinal axis I-I) decreasing progressively in the direction of the coronal end 2a and the core 3 tapers in the direction of the apical end 2b,
  the threads F1 and F2 respectively include coronal surfaces SC1 and SC2 substantially oriented in the direction of the coronal end 2a,
  the threads F1 and F2 respectively include apical surfaces SA1 and SA2 oriented substantially in the direction of the apical end 2b,
  the threads F1 and F2 respectively include respective peripheral lateral surfaces SLP1 and SLP2, one connecting the apical surface SA1 and the coronal surface SC1 and the other connecting the apical surface SA2 and the coronal surface SC2.

It is seen in this FIG. 1 that in the segments T2 and T3 the width L (in a radial plane containing the longitudinal axis I-I) of the peripheral lateral surfaces SLP1 and SLP2 increases relatively strongly in the direction of the coronal end 2a. This greatly increases the screwing insertion torque of the dental implant 1 as and when the segments T2 and T3 are inserted in the bone.

To arrive at the dental implant 1 from FIG. 2, during a second threading cycle, in the segments T2 and T3 of length of the dental implant 1, the apical surfaces SA1 and SA2 and/or the coronal surfaces SC1 and SC2 of the threads F1 and F2 are recut by a threading tool in longitudinal relative movement with a second pitch P2 different from the first pitch P1.

To be more precise:
  if the second pitch P2 is greater than the first pitch P1 the apical surfaces SA1 and SA2 are recut. The second pitch P2 is therefore equal to the apical pitch PA and is greater than the first pitch P1 which is the coronal pitch PC (defined by the coronal surfaces SC1 and SC2 that are not recut, as shown in FIG. 4);
  if the second pitch P2 is smaller than the first pitch P1, the coronal surfaces SC1 are SC2 are recut. The second pitch P2 is therefore equal to the coronal pitch PC and is less than the first pitch P1 that is the apical pitch PA (defined by the apical surfaces SA1 and SA2 that are not recut).

The second threading cycle brings about a reduction of the width L (in a radial plane containing the longitudinal axis I-I) of the peripheral lateral surfaces SLP1 and SLP2 which reduction progressively increases in the direction of the coronal end 2a. It is therefore possible to attenuate at least in part the increase in the width L (in a radial plane containing the longitudinal axis I-I) of the peripheral lateral surfaces SLP1 and SLP2 in the direction of the coronal end 2a that the dental implant 1 includes following the first threading cycle (FIG. 1).

It is seen that in FIG. 2 in the segments T2 and T3 the width L (along the longitudinal axis I-I) of the peripheral lateral surfaces SLP1 and SLP2 increases less strongly in the direction of the coronal end 2a than in FIG. 1. This markedly attenuates the increase in the insertion torque of the segments T2 and T3 (and therefore of the dental implant 1) as and when they penetrate into the bone.

After the second threading cycle there may be formed in the threading 4 a plurality of tapping grooves such as the grooves R1 and R2 (FIG. 3) so as to render the dental implant 1 self-tapping.

Figure 5:
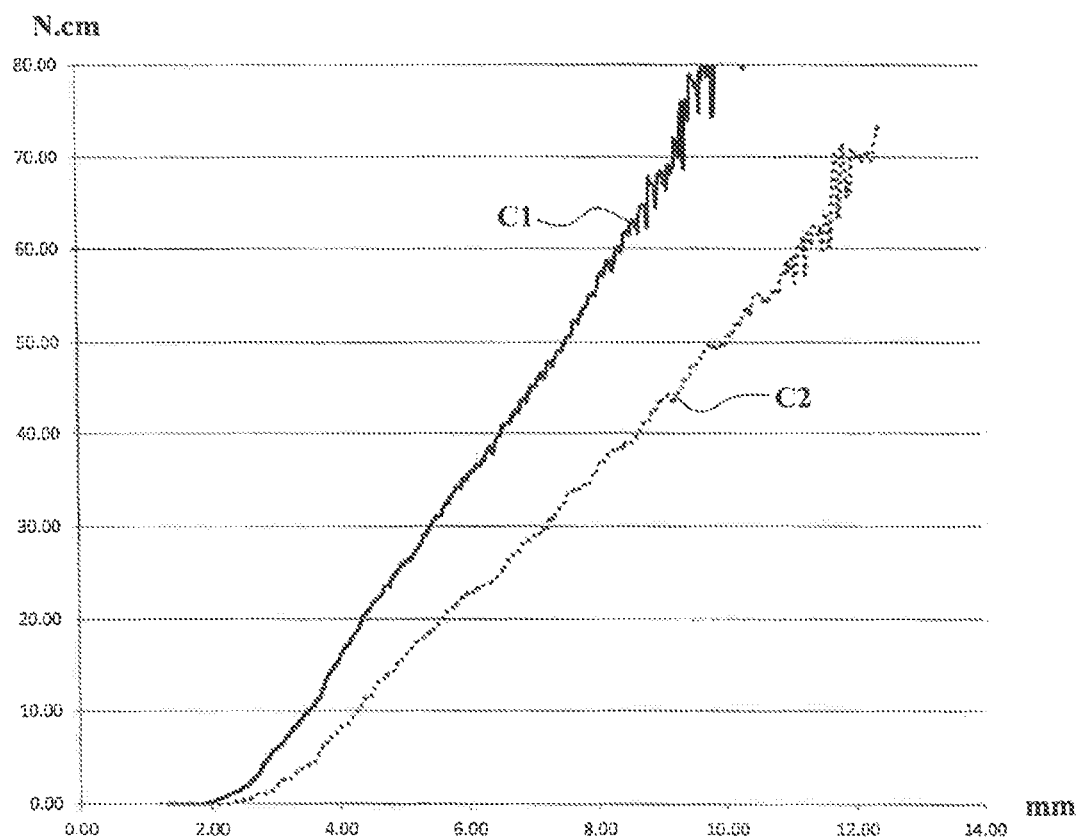
FIG. 5 is a graph showing the insertion torque of the dental implant from FIG. 3 and of a dental implant that is not in accordance with the invention.

The effect of the invention in terms of attenuation of the screwing insertion torque is shown in the FIG. 5 graph, which shows the insertion torque (in N·cm) as a function of the penetration (in mm) by screwing two dental implants into a polyurethane biomechanical test block of density 40 PCF (pound per cubic foot) representative of high density bone.

The curve C1 concerns a dental implant similar to FIG. 1 (but further provided with three tapping grooves similar to the tapping grooves R1 and R2 in FIG. 3) of maximum outside diameter (in the segment T2) of 4 mm and having a total length of 12 mm. The latter has been inserted by screwing it into a hole with an inside diameter of 3.6 mm.

The curve C2 concerns a dental implant 1 according to the invention as shown in FIG. 3 (with three tapping grooves similar to the tapping grooves R1 and R2 in FIG. 3) of maximum outside diameter (In the segment T2) of 4 mm and having a total length of 12 mm. The latter has been inserted by screwing it into a hole with an inside diameter of 3.6 mm.

It is seen that the insertion torque shown by the curve C1 increases rapidly to 80 N·cm for a penetration travel very slightly less than 10 mm. Screwing was then interrupted at 80 N·cm in order not to damage the internal connector arrangement of the dental implant enabling it to be driven in rotation to screw it in. This means in practice that the insertion of the dental implant has failed: it has not been possible to do this in the block over all its length of 12 mm.

It is seen that the insertion torque of the dental implant 1 according to the invention illustrated by the curve C2 increases less rapidly. For a penetration of approximately 10 mm the insertion torque is approximately 50 N·cm, which is very much less than the 80 N·cm of the implant without the present invention. This succeeds in inserting the dental implant 1 to the entirety of its length 12 mm without exceeding an insertion torque of 70 N·cm, which is not likely to damage the internal connector arrangement of the dental implant 1 enabling it to be driven in rotation to screw it in.

The curve C2 has a lesser slope than the curve C1: thanks to the invention, the increase in the screwing insertion torque is greatly attenuated.

The present invention is not limited to the embodiments that have been explicitly described but includes the various variants and generalizations thereof contained within the scope of the following claims.

The invention claimed is:

1. Dental implant comprising an implant body extending along a longitudinal axis (I-I) between a coronal end and an apical end, said implant body having a core, along which there extends a helical threading having at least one thread, said dental implant having at least one segment in which the threading has a height (H) which decreases progressively in the direction of the coronal end and in which the core is tapered in the direction of the apical end, said at least one thread having an apical surface oriented towards the apical end of the dental implant, a coronal surface oriented towards the coronal end of the dental implant, and a peripheral lateral surface connecting the apical surface and the coronal surface of said at least one thread, in which:

the apical surface of said at least one thread has, in section along the longitudinal axis (I-I), a first profile which repeats according to an apical pitch, wherein apical pitch is defined as a distance between a given apical surface and a next consecutive apical surface of said at least one thread, the distance being measured between locations where the apical surfaces are connected to the core, the coronal surface of said at least one thread has, in section along the longitudinal axis (I-I), a second profile which repeats according to a coronal pitch, wherein coronal pitch is defined as a distance between a given coronal surface and a next consecutive coronal surface of said at least one thread, the distance being measured between locations where the coronal surfaces are connected to the core, wherein, in said at least one segment, the apical pitch is greater than the coronal pitch.

2. Dental implant according to claim 1, wherein the coronal pitch and apical pitch are constant.

3. Dental implant according to claim 2, wherein the ratio of the apical pitch and the coronal pitch is in the range of 1 to 1.1, excluding the value of 1.

4. Dental implant according to claim 1, wherein one of the coronal pitch and apical pitch is constant, while the other of the coronal pitch and apical pitch increases progressively.

5. Dental implant according to claim 1, wherein the core is tapered conically in the direction of the apical end on said at least one segment of the dental implant.

6. Dental implant according to claim 5, wherein, in said at least one segment of the dental implant in which the core is tapered in the direction of the apical end, the threading is tapered in the direction of the apical end.

7. Dental implant according to claim 6, wherein, in said at least one segment of the dental implant:

the core and the threading are conical, the core has a taper greater than the taper of the threading.

8. Dental implant according to claim 6, wherein, in said at least one segment of the dental implant in which the core is tapered in the direction of the apical end, the threading is conically tapered in the direction of the apical end.

* * * * *